United States Patent
Okutani et al.

(10) Patent No.: US 11,621,450 B2
(45) Date of Patent: Apr. 4, 2023

(54) BATTERY CAN AND CYLINDRICAL BATTERY

(71) Applicant: Panasonic Intellectual Property Management Co., Ltd., Osaka (JP)

(72) Inventors: Oose Okutani, Hyogo (JP); Takeshi Enomoto, Osaka (JP); Masayoshi Yoshida, Osaka (JP); Akira Takano, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 40 days.

(21) Appl. No.: 16/577,219

(22) Filed: Sep. 20, 2019

(65) Prior Publication Data

US 2020/0013994 A1 Jan. 9, 2020

Related U.S. Application Data

(63) Continuation of application No. PCT/JP2018/001861, filed on Jan. 23, 2018.

(30) Foreign Application Priority Data

Mar. 24, 2017 (JP) .............................. JP2017-060093

(51) Int. Cl.
  *H01M 50/10* (2021.01)
  *H01M 10/04* (2006.01)
  *H01M 10/0525* (2010.01)

(52) U.S. Cl.
  CPC ....... *H01M 50/10* (2021.01); *H01M 10/0422* (2013.01); *H01M 10/0525* (2013.01)

(58) Field of Classification Search
  CPC .... H01M 2/02; H01M 2/023; H01M 10/0422; H01M 10/0525; H01M 50/10; H01M 50/167; H01M 60/10; H01M 60/56
  See application file for complete search history.

(56) References Cited

U.S. PATENT DOCUMENTS

2009/0151863 A1 6/2009 Teramoto

FOREIGN PATENT DOCUMENTS

| CN | 101199064 A | 6/2008 |
|---|---|---|
| JP | 10-83800 A | 3/1998 |
| JP | 2004-241251 A | 8/2004 |

(Continued)

OTHER PUBLICATIONS

English Translation of WO 2007-142270.*

(Continued)

*Primary Examiner* — Stephen J Yanchuk
(74) *Attorney, Agent, or Firm* — WHDA, LLP

(57) ABSTRACT

A battery can has a cylindrical body section, an opening section at one end of the body section, and a bottom section closing the other end of the body section. An annularly grooved portion is formed by constriction near the open end of the opening section. The annularly grooved portion has an upper-groove section as the section closer to the open end than the narrowest section, which is positioned farthest inside, of the grooved portion, and also has a lower-groove section as the section closer to the bottom section than the narrowest section. The wall thickness T1 of the lower-groove section is larger than the wall thickness T2 of the body section.

8 Claims, 4 Drawing Sheets

(56) References Cited

FOREIGN PATENT DOCUMENTS

| | | | |
|---|---|---|---|
| JP | 2005-190688 A | 7/2005 | |
| JP | 2005-293922 A | 10/2005 | |
| JP | 2007-123224 A | 5/2007 | |
| JP | 2007-234606 A | 9/2007 | |
| JP | 2009-176551 A | 8/2009 | |
| WO | WO 2007-142270 | * | 1/2006 |

OTHER PUBLICATIONS

International Search Report dated Apr. 10, 2018, issued in counterpart Application No. PCT/JP2018/001861 (1 pages).
English Translation of Chinese Search Report dated Jul. 5, 2021, issued in counterpart CN application No. 201880008787.2. (3 pages).

* cited by examiner

BATTERY CAN AND CYLINDRICAL BATTERY

TECHNICAL FIELD

The present invention relates to a battery can and a cylindrical battery that includes it.

BACKGROUND ART

An ordinary cylindrical battery includes a power-generating element and a bottomed cylindrical battery can that contains the power-generating element. Near the open end of the opening section of the battery can, a portion with an inward annular groove is formed. By placing a cap so that the grooved portion supports it, the opening section is closed.

For the formation of an annularly grooved portion around a battery can, various methods have been proposed. For example, pressing a rib formed on the circumferential surface of a roller near the open end of a battery can will form a portion with an inward annular groove. The deformation in the annularly grooved portion is a type of plastic deformation in which the wall of the can is stretched, so the wall thickness of the grooved portion is usually smaller than before the deformation. As an attempt to improve the workability of battery cans for higher consistency in the shape of the groove, manufacturers have reduced the hardness of the region to be worked, by thinning the region beforehand. Thinning the grooved portion, however, affects the strength of the grooved portion.

As a solution to this, PTL 1 makes a proposal aimed at improving consistency in shape and limiting the thinning of the annularly grooved portion: With the bottom surface of the battery can pressed upward, the ratio of the speed of rotation of the battery can to the rate at which the grooving roller is pushed is set to 2.0 or more and 5.5 or less.

CITATION LIST

Patent Literature

PTL 1: Japanese Published Unexamined Patent Application No. 2009-176551

SUMMARY OF INVENTION

Misuse of a battery can cause abrupt production of gas inside the battery and trigger the safety mechanism of the battery. For cylindrical batteries, part of the gas produced inside the battery moves along the interface between the battery can and the power-generating element (i.e., the inner surface of the battery can). The stream of gas may hit the annularly grooved portion, damaging the grooved portion. It is desired to avoid as much damage to the grooved portion as possible for normal operation of the safety mechanism.

In light of this, a battery can according to an aspect of the present disclosure has a cylindrical body section, an opening section at one end of the body section, and a bottom section closing the other end of the body section. Near the open end of the opening section is an annularly grooved portion formed by constriction. The grooved portion has an upper-groove section as the section closer to the open end than the narrowest section, which is positioned farthest inside, of the grooved portion, and also has a lower-groove section as the section closer to the bottom section than the narrowest section. The wall thickness T1 of the lower-groove section is larger than the wall thickness T2 of the body section.

A cylindrical battery according to another aspect of the present disclosure includes an electrode assembly, an electrolyte, a battery can as described above, the battery can containing the electrode assembly and the electrolyte, a first insulating plate between the annularly grooved portion and the end face of the electrode assembly closer to the opening section, and a second insulating plate between the bottom section and the end face of the electrode assembly closer to the bottom section.

The present disclosure helps enhance the safety of cylindrical batteries.

BRIEF DESCRIPTION OF DRAWINGS

FIG. 2 (a) is a diagram illustrating the relative positions of the annularly grooved portion and a first insulating plate and the structure of each section of the grooved portion, and FIG. 2 (b) is a diagram illustrating the wall thickness of each section of the grooved portion and where the minimum radius of curvature is formed.

DESCRIPTION OF EMBODIMENTS

Figure 1:
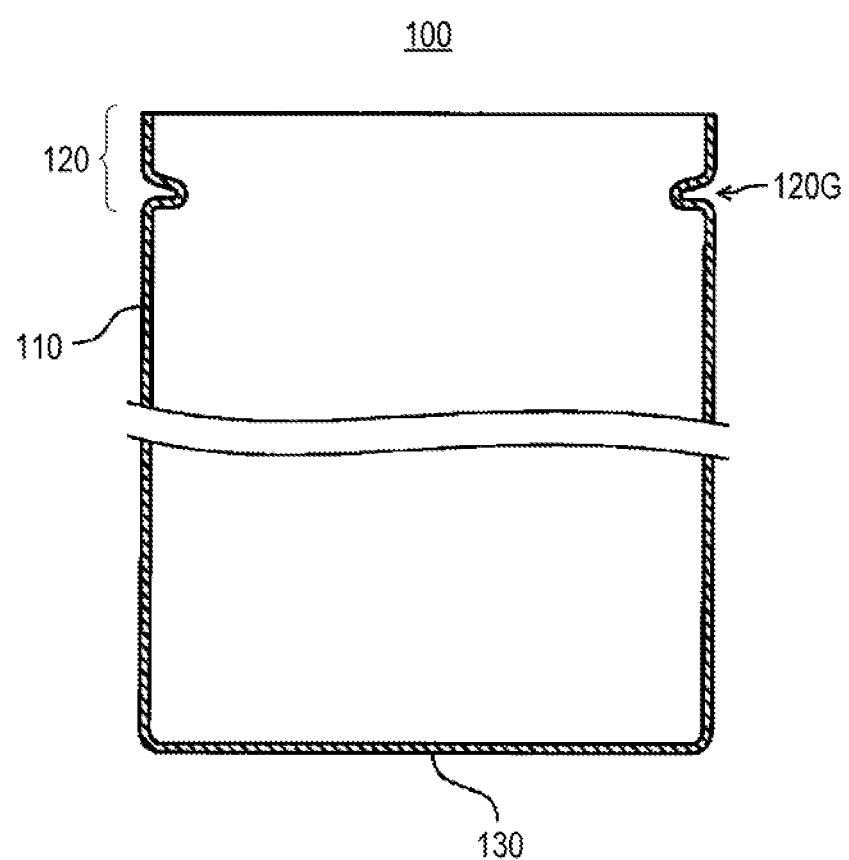
FIG. 1 is a longitudinal cross-sectional view of a battery can according to an embodiment of the present invention.

A battery can according to an embodiment of the present invention has a cylindrical body section, an opening section at one end of the body section, and a bottom section closing the other end of the body section. Near the open end of the opening section is an annularly grooved portion formed by constriction. Here, the opening section is not exclusively the open end but refers to a region that includes the nearby annularly grooved portion. The annularly grooved portion has a narrowest section as the section positioned farthest inside, an upper-groove section as the section closer to the open end than the narrowest section, and a lower-groove section as the section closer to the bottom section than the narrowest section.

Constriction refers to a type of processing in which, for example, a jig is pressed against the wall of a battery can from outside, and the wall is pushed inward along the circumferential surface of the battery can so that the inner surface of the wall will protrude inward. Since the total quantity of the material for the can wall forming the grooved portion is finite, the wall thickness of the grooved portion is usually smaller than before the deformation by constriction.

By changing parameters for constriction, however, the wall thickness T1 of the lower-groove section can be made larger than the wall thickness T2 of the body section. For example, the manufacturer can supply more can wall material to the lower-groove section than to the upper-groove section by controlling the process so that the coefficient of friction between the jig and the upper-groove section being worked is larger than that between the jig and the lower-groove section being worked. Such an act of processing results in a wall thickness T1 of the lower-groove section larger than the wall thickness T2 of the body section and larger than the wall thickness T3 of the upper-groove section.

Misuse of a battery can cause abrupt production of gas inside the battery, and the stream of gas moving along the interface between the battery can and the power-generating element may hit the grooved portion. When this occurs, the stream of gas hits the lower-groove section first. This means the grooved portion becomes more resistant to being hit by the stream of gas, and the damage to the grooved portion becomes smaller, with increasing wall thickness T1 of the lower-grooved section. Making the wall thickness T1 of the lower-groove section larger than the wall thickness T2 of the body section, moreover, improves the overall strength of the annularly grooved portion.

As for the thickness T3 of the upper-groove section, which is shielded from the stream of gas by the lower-groove section, it does not need to be larger than the thickness T2 of the body section.

A wall thickness T1 of the lower-groove section that is, for example, larger than or equal to 1.01 times the wall thickness T2 of the body section improves the durability and strength of the grooved portion and therefore is effective in improving the safety of the battery. More preferably, however, T1 is larger than or equal to 1.15 times T2, even more preferably larger than or equal to 1.3 times T2, so that more significant effects will be obtained. It is, however, difficult to increase the wall thickness T1 of the lower-groove section excessively beyond the wall thickness T2 of the body section. T1 can be increased to a maximum of about 1.6 times T2.

Here, the wall thickness T1 of the lower-groove section is the thickness of the thickest portion of the lower-groove section as observed in any cross-section along the axial direction (longitudinal cross-section) of the battery can. Likewise, the wall thickness T3 of the upper-groove section is the thickness of the thickest portion of the upper-groove section as observed in the same longitudinal cross-section of the battery can.

The thickness T2 of the body section is the mean of thickness measurements from multiple points of the body section as observed in the same longitudinal cross-section. For example, if the height of the body section is denoted by H, T2 can be determined by measuring the thickness of the body section at heights of 0.25H, 0.5H, and 0.75H from the bottom section of the battery can and calculating the mean.

Making the wall thickness T1 of the lower-groove section larger than the wall thickness T2 of the body section leads to a flatter shape of the lower-groove section because the curving of the lower-groove section during processing is reduced. At the boundary between such a lower-groove section and the body section, the wall of the can bends with a larger curvature (forming a smaller radius of curvature). The minimum radius of curvature r1 at the boundary between the inner surface of the lower-groove section and that of the body section can be, for example, 0.2 mm or less. The smaller the minimum radius of curvature r1 is, the smaller the slope of the lower-groove section is.

Figure 2:
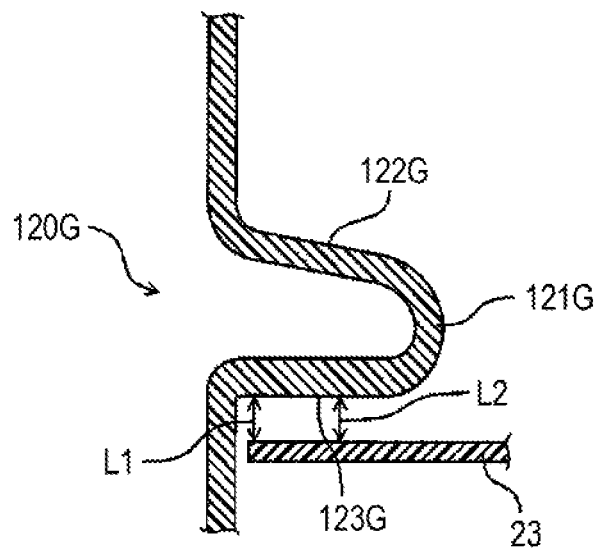
FIGS. 2 (a) and 2 (b) present enlarged cross-sectional views of the annularly grooved portion of the battery can.
Figure 2:
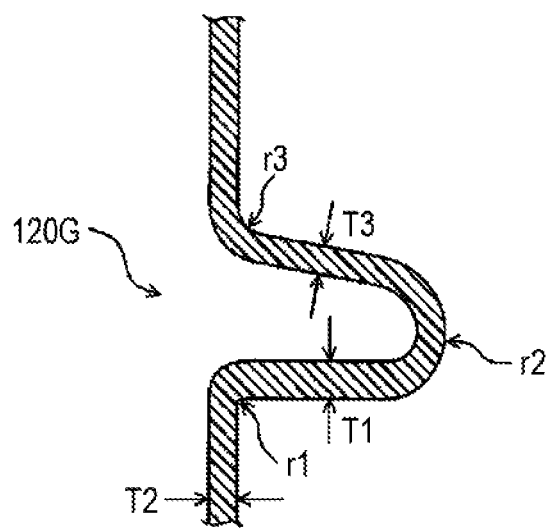

FIG. 1 illustrates an example of an annularly grooved portion of a battery can in an enlarged cross-sectional view. FIGS. 2 (a) and 2 (b) present enlarged cross-sectional views of the annularly grooved portion of the battery can. The battery can 100 has a cylindrical body section 110, an opening section 120 at one end of the body section 110, and a bottom section 130 closing the other end of the body section 110. Near the open end of the opening section 120 is an annularly grooved portion 120G formed by constriction. The annularly grooved portion 120G has a narrowest section 121G, an upper-groove section 122G as the section closer to the open end than the narrowest section 121G, and a lower-groove section 123G as the section closer to the bottom section than the narrowest section 121G. The wall thickness T1 of the lower-groove section 123G is larger than the wall thickness T2 of the body section 110 and the wall thickness T3 of the upper-groove section 122G. As for the shape of the lower-groove section 123G, this section is close to flatness in shape in comparison with the upper-groove section 122G, and the minimum radius of curvature r1 at the boundary between the inner surface of the lower-groove section 123G and that of the body section 110 is smaller than the minimum radius of curvature r3 at the boundary between the inner surface of the upper-groove section 122G and that of the body section 110.

The transverse cross-sectional shape of the body section of the battery can is typically round or a nearly round shape, but these are not the only options. The length of the body section is not critical either, but by way of example, it is between 60 mm and 80 mm. The inner diameter of the body section is not critical either, but by way of example, it is between Ø18 mm and Ø22 mm.

The width to which the grooved portion protrudes inward (depth of the groove) is determined by the size of the battery, but if the inner diameter of the body section is within the above range, it is, for example, between 0.9 mm and 2.5 mm.

The wall thickness of the body section is determined by the material of which the battery can is made, the size of the battery, etc., but if the length of the body section is within the above range, it is, for example, between 0.15 mm and 0.4 mm. In this case, the wall thickness of the bottom section is, for example, between 0.3 mm and 0.5 mm.

The material for the battery can is, to name a few, iron, an iron alloy, stainless steel, aluminum, or an aluminum alloy but is not critical.

The type of the battery is not critical, but the battery can described above is suitable for use as a battery case for nonaqueous electrolyte batteries that require high safety, such as lithium ion secondary batteries.

Next is described an example of a cylindrical battery that uses a battery can as described above.

The cylindrical battery includes an electrode assembly, an electrolyte, and a battery can containing the electrode assembly and the electrolyte. Between the annularly grooved portion of the battery can and the end face of the electrode assembly closer to the opening section, a first insulating plate is placed to prevent internal short-circuiting. Likewise, between the bottom section of the battery can and the end face of the electrode assembly closer to the bottom section, a second insulating plate is placed.

As the slope of the lower-groove section becomes smaller as the minimum radius of curvature r1 at the boundary between the inner surface of the lower-groove section and that of the body section decreases, the outermost edge of the first insulating plate becomes less likely to be squeezed by the lower-groove section. Even if the maximum diameter d of the first insulating plate is brought as close to the inner diameter D of the body section as possible, therefore, the damage to the first insulating plate from the squeeze is smaller. The first insulating plate's effect of preventing internal short-circuiting is enhanced with increasing maximum diameter d of the first insulating plate.

The first and second insulating plates are made of a material that is primarily an insulating resin, such as a phenolic resin, and preferably are ones formed by a core and an insulating fibrous material contained therein.

The maximum diameter d of the first insulating plate and the inner diameter D of the body section preferably satisfy $0.98 \le d/D < 1$. This ensures little space is created between the outermost edge of the first insulating plate and the inner surface of the body section, and the space there can be as small as, for example, 100 μm or less. Even if the electrode assembly were deformed, for example if its components became wound out of place, because of hard impact, therefore, it would be unlikely that an electrode and the battery can come into contact near the outermost periphery of the electrode assembly.

The smaller the slope of the lower-groove section is, the better, and it is preferred that the distance L1 from the outermost edge of the first insulating plate to the inner surface of the lower-groove section in the direction of the axis of the electrode assembly be almost equal to the distance L2 from the point of the first insulating plate closer to the center than the outermost edge by ½ of the protruding width of the grooved portion to the inner surface of the lower-groove section in the same axial direction. More specifically, it is preferred that $0.97 < L2/L1 < 1.5$ be satisfied, and it is more preferred that $1.05 < L2/L1 < 1.45$ be satisfied.

It should be noted that the parameters such as the wall thicknesses T1 to T3, minimum radii of curvature r1 to r3, width to which the grooved portion protrudes inward, maximum diameter d of the first insulating plate, inner diameter D of the body section, and L2/L1 may be measured on a CT scan or may be measured on a cross-section obtained by slicing the battery or battery can after embedding it, for example in resin, so that it will not deform.

Figure 3:
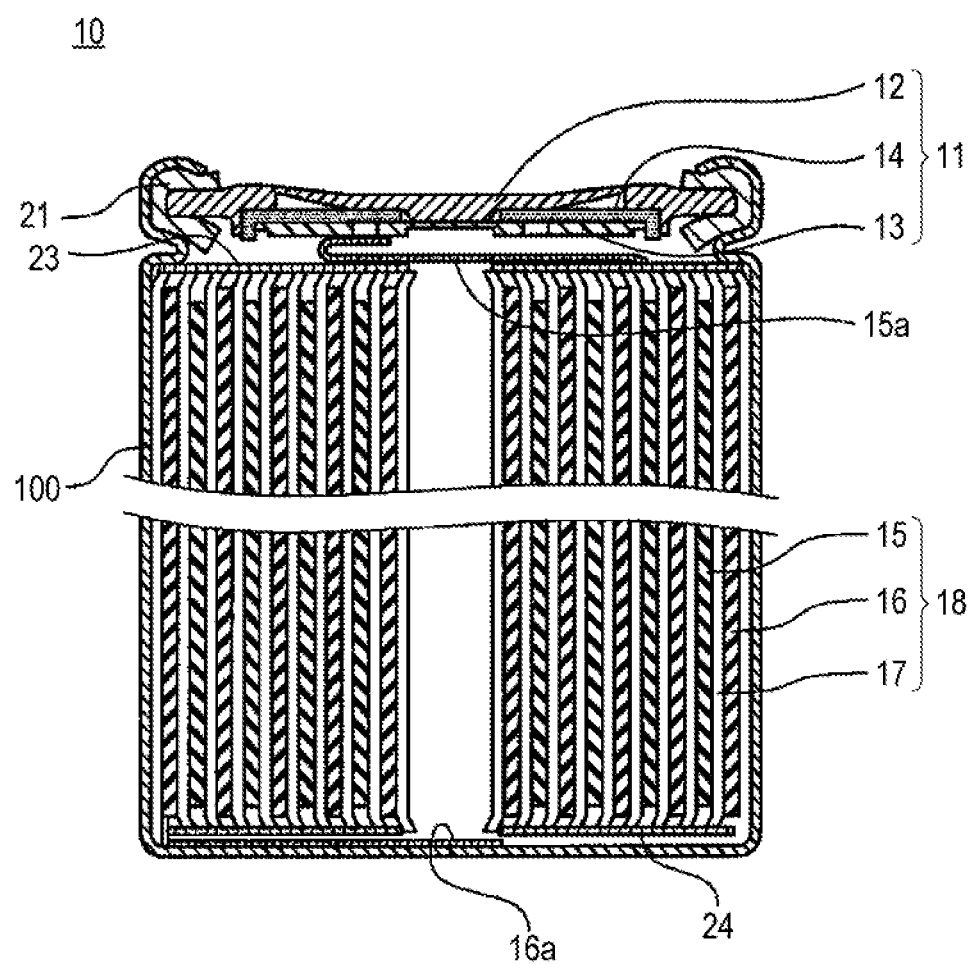
FIG. 3 is a longitudinal cross-sectional view of a cylindrical battery according to an embodiment of the present invention.

The following describes a cylindrical battery according to an embodiment of the present invention, taking a lithium ion secondary battery as an example, with reference to FIG. 3. FIG. 3 is a longitudinal cross-sectional view of a lithium ion secondary battery.

The lithium ion secondary battery (hereinafter the battery) 10 includes an electrode assembly 18, an electrolyte (not illustrated), and a battery can 100 containing them. The electrode assembly 18 is formed by a positive electrode plate 15, a negative electrode plate 16, and a separator 17, with the electrode plates wound together with the separator 17 therebetween. Near the open end of the battery can 100 is an annularly grooved portion 120G. Between one end face of the electrode assembly 18 and the annularly grooved portion 120G is a first insulating plate 23. Between the other end face of the electrode assembly 18 and the bottom section 130 of the battery can 100 is a second insulating plate 24.

The outermost edge of the first insulating plate 23 is held between the corresponding end face of the electrode assembly 18 and the annularly grooved portion 120G. The maximum diameter d of the first insulating plate 23 and the inner diameter D of the body section 110 are almost equal and satisfy $0.98 \le d/D < 1$. Moreover, the distance L1 from the outermost edge of the first insulating plate 23 to the inner surface of the lower-groove section 123G in the direction of the axis of the electrode assembly 18 is almost equal to the distance L2 from the point of the first insulating plate 23 closer to the center than the outermost edge by ½ of the protruding width of the grooved portion to the inner surface of the lower-groove section 123G in the same axial direction, and $0.97 < L2/L1 < 1.5$ is satisfied (see FIG. 2 (a)).

The opening section of the battery can 100 is closed with a cap 11 fitted with a gasket 21 around its periphery. The cap 11 includes a valve 12, a metal plate 13, and an annular insulating member 14 interposed between the outer periphery of the valve 12 and that of the metal plate 13. The valve 12 and the metal plate 13 are connected together at their respective centers. The positive electrode lead 15a, from the positive electrode plate 15, is connected to the metal plate 13. The valve 12 therefore functions as the outer terminal of the positive electrode. The negative electrode lead 16a, from the negative electrode plate 16, is connected to the inner surface of the bottom section of the battery can 100.

The positive electrode plate 15 includes a foil positive electrode current collector and a positive electrode active material layer formed on its surface. The positive electrode current collector can be made of, for example, aluminum, an aluminum alloy, stainless steel, titanium, or a titanium alloy. The positive electrode active material is preferably a lithium transition metal composite oxide. For example, a composite oxide that contains at least one selected from the group consisting of cobalt, manganese, nickel, chromium, and iron and also contains lithium is used.

The negative electrode plate 16 includes a foil negative electrode current collector and a negative electrode active material layer formed on its surface. The negative electrode current collector can be made of, for example, copper, a copper alloy, nickel, a nickel alloy, or stainless steel. The negative electrode active material can be a carbon material capable of reversible storage and release of lithium ions, such as natural graphite, artificial graphite, hard carbon, or soft carbon, tin oxide, or silicon oxide.

The separator 17 can be, for example, a microporous film formed from a polyolefin. Examples of polyolefins include polyethylene, polypropylene, and ethylene-propylene copolymers.

The electrolyte includes a nonaqueous solvent and a lithium salt dissolved in the nonaqueous solvent. The nonaqueous solvent is, for example, a cyclic carbonate, such as ethylene carbonate, propylene carbonate, or butylene carbonate, a linear carbonate, such as dimethyl carbonate, diethyl carbonate, or ethyl methyl carbonate, a carboxylate, or a linear ether. The lithium salt is, for example, $LiPF_6$, $LiBF_4$, or $LiClO_4$.

Next is described how to form an annularly grooved portion on a battery can.

Figure 4:
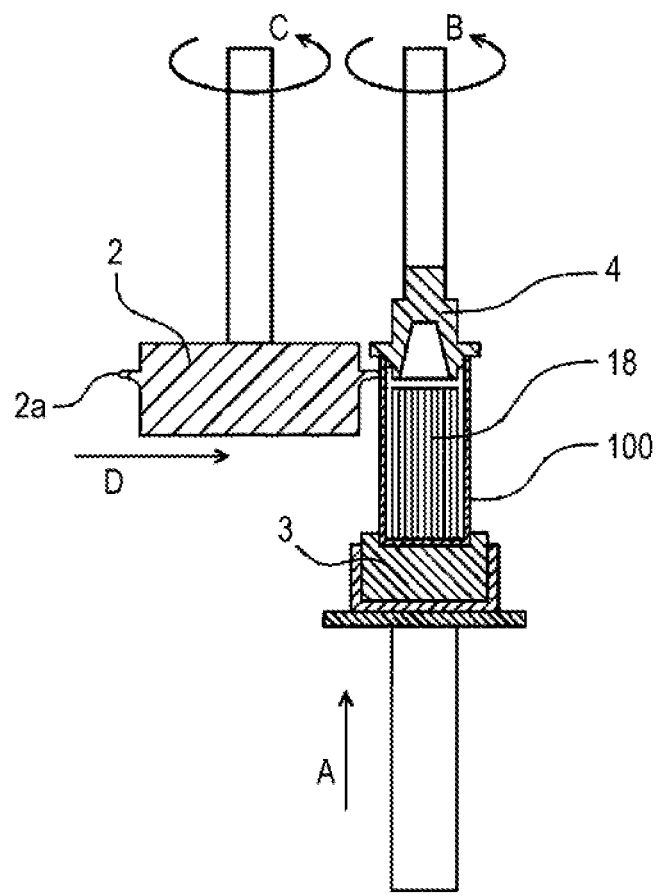
FIG. 4 is a diagram for describing a step of forming an annularly grooved portion on a battery can.

FIG. 4 illustrates a schematic view of a grooving device, with which an annularly grooved portion is formed around a battery can. The grooving device includes a lower-die mechanism 3 that holds the bottom section 130 of the battery can 100 and pushes up the battery can 100 toward the opening section 120 side in the axial direction, an upper-die mechanism 4 that holds the opening section 120 of the battery can 100 and rotates the battery can 100, and a pressing mechanism that presses a jig (grooving roller 2) against the wall of the battery can 100 from outside at a predetermined moving speed and pushes the can wall inward along the circumferential surface of the battery can 100 so that the inner surface of the can wall will protrude inward.

The grooving roller 2 is a flat columnar rotor having an annular rib 2a around its circumferential surface, the annular rib 2a formed to the shape of the groove. Pushing up of the battery can 100 by the lower-die mechanism 3 causes the material forming the battery can to be supplied from the body section 110 and bottom section 130 side in a quantity required to make the wall thickness T1 of the lower-groove section 123G large.

The battery can 100 moves in the direction indicated by arrow A (upward) with its bottom section 130 held by the lower-die mechanism 3, which is capable of moving up and down. The opening section 120 of the battery can 100 is pressed with the upper-die mechanism 4. Rotation of the upper-die mechanism 4 in the direction indicated by arrow B causes the battery can 100 to rotate. The grooving roller 2 moves sideways in the direction of arrow D at a constant speed to push into the battery can 100 to a predetermined width. Once the annular rib 2a of the grooving roller 2 touches near the open end of the rotating battery can 100, the grooving roller 2 also rotates in the direction indicated by arrow C. As the grooving roller 2 moves sideways, the wall of the battery can 100 is pushed inward along the circumferential surface of the battery can 100, forming an annularly grooved portion 120G.

By controlling parameters such as the rate at which the lower-die mechanism 3 pushes up the battery can 100, the speed of the rotation of the battery can 100 caused by the upper-die mechanism 4, the rate at which the pressing mechanism pushes the grooving roller 2 into the battery can 100, and the shape of the annular rib 2a, the coefficient of friction between the grooving roller and the upper-groove section being worked and that between the grooving roller and the lower-groove section being worked can each be controlled to be within a desired range.

Next, an embodiment of the present invention is further described on the basis of examples.

Example 1

(1) Production of a Positive Electrode Plate

One hundred parts by mass of a positive electrode active material ($LiNi_{0.8}Co_{0.15}Al_{0.05}O_2$), 1.7 parts by mass of a binder (polyvinylidene fluoride), and 2.5 parts by weight of a conducting agent (acetylene black) were put into a dispersion medium, and the materials were kneaded, to give a positive electrode mixture slurry. The positive electrode mixture slurry was applied to both sides of a positive electrode current collector made from aluminum foil, dried, and rolled to form a positive electrode active material layer, and the workpiece was cut to predetermined dimensions to give a positive electrode plate. Part of the positive electrode current collector was exposed, and an aluminum positive electrode lead was connected there.

(2) Production of a Negative Electrode Plate

One hundred parts by mass of a negative electrode active material (graphite), 0.6 parts by mass of a binder (styrene-butadiene rubber), and 1 part by weight of a thickening agent (carboxymethyl cellulose) were put into a dispersion medium, and the materials were kneaded to give negative electrode mixture slurry. The negative electrode mixture slurry was applied to both sides of a negative electrode current collector made from copper foil, dried, and rolled to form a negative electrode active material layer, and the workpiece was cut to predetermined dimensions to give a negative electrode plate. Part of the negative electrode current collector was exposed, and a nickel negative electrode lead was connected there.

(3) Preparation of a Nonaqueous Electrolyte

Ethylene carbonate (EC), dimethyl carbonate (DMC), and ethyl methyl carbonate (EMC) were mixed to give a nonaqueous solvent. $LiPF_6$ was dissolved in the nonaqueous solvent to a concentration of 1 mol/L, giving a nonaqueous electrolyte.

(4) Fabrication of a Battery

The positive and negative electrode plates were wound together with a microporous film made of polyolefin (separator) therebetween to form an electrode assembly. With a second insulating plate placed on its lower end face, the electrode assembly was inserted into a battery can, and the negative electrode lead was welded to the bottom section of the battery can by electric resistance welding. The battery can was an iron can plated with nickel on its inner and outer surfaces. The inner diameter D of the body section=20.4 mm, and the height H=70 mm.

After a disk-shaped first insulating plate with a diameter d=20.2 mm (d/D=0.99) was placed on the upper end face of the electrode assembly, an annularly grooved portion was formed near the open end of the battery can using a device as illustrated in FIG. 4. The width to which the grooving roller was pushed into the battery can (width to which the grooved portion was sticking out) was 1.7 mm.

The annularly grooved portion satisfies the following conditions.

Wall thickness T1 of the lower-groove section=0.34 mm

Wall thickness T2 of the body section=0.30 mm (T1/T2=1.13)

Wall thickness T3 of the upper-groove section=0.22 mm

Minimum radius of curvature r1 at the boundary between the inner surface of the lower-groove section and that of the body section=0.1 mm Then the positive electrode lead was connected to a metal plate as a component of a cap equipped with a safety mechanism, the cap was placed so that the annularly grooved portion formed on the battery can would support it with a gasket therebetween, the open end of the battery can was crimped around the peripheral edge of the cap to complete a lithium ion secondary battery. L2=0.5 mm, and L2/L1=1.45. The squeeze by the lower-groove section deformed the outermost edge of the first insulating plate toward the bottom section only to a slight extent.

Comparative Example 1

A lithium ion secondary battery was completed as in Example 1 except that the parameters of the annularly grooved portion were changed as follows. T3 and r1 also changed with the change in T1 and T2. L2/L1 exceeded 1.5, and the deformation of the outermost edge of the first insulating plate was greater than in Example 1.

Wall thickness T1 of the lower-groove section=0.30 mm

Wall thickness T2 of the body section=0.30 mm (T1/T2=1)

Comparative Example 2

A lithium ion secondary battery was completed as in Example 1 except that the parameters of the annularly grooved portion were changed as follows. T3 and r1 also changed with the change in T1 and T2. L2/L1 exceeded 1.6, and the deformation of the outermost edge of the first insulating plate was even greater than in Comparative Example 1.

Wall thickness T1 of the lower-groove section=0.28 mm

Wall thickness T2 of the body section=0.30 mm (T1/T2<1)

The inventors believe that the battery of Example 1, which satisfied T1/T2>1, was greatly improved in comparison with the batteries of Comparative Examples 1 and 2 in terms of safety in abrupt production of gas inside the battery caused by misuse.

INDUSTRIAL APPLICABILITY

Cylindrical batteries that include a battery can according to the present invention are particularly useful in nonaqueous electrolyte secondary batteries with high energy densities by virtue of their high safety.

REFERENCE SIGNS LIST

10: Lithium ion secondary battery
11: Cap

12: Valve
13: Metal plate
14: Insulating member
15: Positive electrode plate
15a: Positive electrode lead
16: Negative electrode plate
16a: Negative electrode lead
17: Separator
18: Electrode assembly
21: Gasket
23: First insulating plate
24: Second insulating plate
100: Battery can
110: Body section
120: Opening section
120G: Annularly grooved portion
121G: Narrowest section
122G: Upper-groove section
123G: Lower-groove section
130: Bottom section

The invention claimed is:

1. A battery can comprising:
a cylindrical body section;
an opening section at one end of the body section;
a bottom section closing the other end of the body section; and
an annularly grooved portion formed by constriction near an open end of the opening section, wherein:
the annularly grooved portion comprising an upper-groove section, a narrowest section and a lower-groove section, the upper-groove section closer to the open end than the narrowest section, the narrowest section positioned farthest inside of the grooved portion, and the lower-groove section closer to the bottom section than the narrowest section; and
a wall thickness T1 of the lower-groove section is larger than a wall thickness T2 of the body section,
wherein the wall thickness T1 of the lower-groove section is larger than a wall thickness T3 of the upper-groove section,
wherein the wall thickness T3 of the upper-groove section is smaller than the wall thickness T2 of the body section,
wherein the wall thickness T1 is in the thickest portion of the lower-groove section, and
wherein the wall thickness T3 is in the thickest portion of the upper-groove section.

2. The battery can according to claim 1, wherein the wall thickness T1 of the lower-groove section is between 1.01 times and 1.6 times the wall thickness T2 of the body section.

3. The battery can according to claim 1, wherein a minimum radius of curvature r1 at a boundary between an inner surface of the lower-groove section and an inner surface of the body section is 0.2 mm or less.

4. A cylindrical battery comprising:
an electrode assembly;
an electrolyte;
a battery can according to claim 1, the battery can containing the electrode assembly and the electrolyte;
a first insulating plate between the annularly grooved portion and an end face of the electrode assembly closer to the opening section; and
a second insulating plate between the bottom section and an end face of the electrode assembly closer to the bottom section.

5. The cylindrical battery according to claim 4, wherein a maximum diameter d of the first insulating plate and an inner diameter D of the body section satisfy $0.98 \leq d/D < 1$.

6. The cylindrical battery according to claim 5, wherein
a distance L1 from an outermost edge of the first insulating plate to an inner surface of the lower-groove section in a direction of an axis of the electrode assembly and
a distance L2 from a point of the first insulating plate closer to a center than the outermost edge by 1/2 of a protruding width of the annularly grooved portion to the inner surface of the lower-groove section in the same axial direction
satisfy $0.97 < L2/L1 < 1.5$.

7. A cylindrical battery comprising:
an electrode assembly;
an electrolyte;
a battery can comprising:
a cylindrical body section;
an opening section at one end of the body section;
a bottom section closing the other end of the body section; and
an annularly grooved portion formed by constriction near an open end of the opening section, wherein:
the annularly grooved portion comprising an upper-groove section, a narrowest section and a lower-groove section, the upper-groove section closer to the open end than the narrowest section, the narrowest section positioned farthest inside of the grooved portion, and the lower-groove section closer to the bottom section than the narrowest section; and
a wall thickness T1 of the lower-groove section is larger than a wall thickness T2 of the body section,
wherein the wall thickness T1 of the lower-groove section is larger than a wall thickness T3 of the upper-groove section,
wherein the wall thickness T3 of the upper-groove section is smaller than the wall thickness T2 of the body section,
wherein the wall thickness T1 is in the thickest portion of the lower-groove section, and
wherein the wall thickness T3 is in the thickest portion of the upper-groove section;
the battery can containing the electrode assembly and the electrolyte;
a first insulating plate between the annularly grooved portion and an end face of the electrode assembly closer to the opening section; and
a second insulating plate between the bottom section and an end face of the electrode assembly closer to the bottom section,
wherein a distance L1 from an outermost edge of the first insulating plate to an inner surface of the lower-groove section in a direction of an axis of the electrode assembly and a distance L2 from a point of the first insulating plate closer to a center than the outermost edge by 1/2 of a protruding width of the annularly grooved portion to the inner surface of the lower-groove section in the same axial direction satisfy $0.97 < L2/L1 < 1.5$.

8. A battery can comprising:
a cylindrical body section;
an opening section at one end of the body section;
a bottom section closing the other end of the body section; and
an annularly grooved portion formed by constriction near an open end of the opening section, wherein:

the annularly grooved portion comprising an upper-groove section, a narrowest section and a lower-groove section, the upper-groove section closer to the open end than the narrowest section, the narrowest section positioned farthest inside of the grooved portion, and the lower-groove section closer to the bottom section than the narrowest section; and a wall thickness T1 of the lower-groove section is larger than a wall thickness T2 of the body section, wherein the wall thickness T1 of the lower-groove section is larger than a wall thickness T3 of the upper-groove section, wherein the wall thickness T3 of the upper-groove section is smaller than the wall thickness T2 of the body section, wherein the wall thickness T1 is in the thickest portion of the lower-groove section, and wherein the wall thickness T3 is in the thickest portion of the upper-groove section;

wherein the annularly grooved portion has a first edge potion and a second edge portion which is opposed to the first edge portion in a radial direction of the battery can, wherein the first edge portion is nearer the deepest portion of the annularly grooved portion than the second edge portion, wherein the lower-groove section includes a first area near the first edge and a second area near the second edge, wherein the upper-groove section includes a first area near the first edge and a second area near the second edge, and wherein the second area of the upper-groove section is more leaned to the bottom section than the second area of the lower-groove section.

\* \* \* \* \*